Feb. 13, 1968   W. H. HARRIS, JR   3,368,263
METHOD OF MAKING GEARS AND THE LIKE
Filed Dec. 30, 1965                 2 Sheets-Sheet 1

INVENTOR.
WILLIAM H. HARRIS, JR.
BY
Barnes, Kisselle, Raisch & Choate
ATTORNEYS

Feb. 13, 1968  W. H. HARRIS, JR  3,368,263
METHOD OF MAKING GEARS AND THE LIKE
Filed Dec. 30, 1965  2 Sheets-Sheet 2

INVENTOR.
WILLIAM H. HARRIS, JR.
BY
Barnes, Kisselle, Raisch & Choate
ATTORNEYS

United States Patent Office 3,368,263
Patented Feb. 13, 1968

3,368,263
METHOD OF MAKING GEARS AND THE LIKE
William H. Harris, Jr., Detroit, Mich., assignor to Dexco Corporation, Detroit, Mich., a corporation of Michigan
Filed Dec. 30, 1965, Ser. No. 517,556
5 Claims. (Cl. 29—159.2)

This invention relates generally to the manufacture of gears, splines, sprockets, shafts having oil grooves, and other articles having peripheral teeth or grooving. Selected for illustration of the invention are gears and splines.

In the manufacture of such articles, a workpiece in unhardened condition is first roughly formed as by means of a hobbing cutter and is then finish formed by means of a shaving tool which removes the final .001″ or .002″ of metal from the workpiece. In the case of gears, they are also faced and bored while the workpiece is in unhardened condition. After shaving, the workpiece is subjected to heat treatment to harden it. Almost invariably, the heat-treating step distorts the article so that the finished product no longer has the accurate configuration which it had after the shaving step. With respect to the vast majority of products made in this manner, it has heretofore not been economically feasible by the use of conventional tools to correct the distortion caused by the heat treating. Heretofore, it has been a virtual impossibility to perform the shaving step after the heat treating because of the hardness of the heat-treated article.

Some efforts have been made to finish grind hardened articles by the use of conventional grinders composed of grits of silicon carbide, aluminum oxide, or the like bonded together in a matrix of glasslike material. Such grinders are, in general, unsatisfactory because inherently they wear unevenly and unpredictably and tend to become loaded if they do not wear at just the proper rate. The use of such equipment, especially in high-speed automated machinery is unsatisfactory because it results in high production costs and in frequent and costly downtime of a production line.

One object of the present invention is to provide a relatively simple and inexpensive method of making such articles so improved that the distortions of the articles caused by the heat treating are eliminated. Another object of the invention is to provide a relatively simple, inexpensive method of making a tool so improved that it is capable of performing finish machining of the articles after they have been heat treated, this machining, with respect to the amount of metal removed, being the equivalent of the conventional shaving step and at the same time removing the distortions caused by the heat treating.

The invention generally contemplates first rough forming the unhardened workpiece and then hardening it by heat treating. Thereafter, the article is finish machined and the distortions removed by means of a tool having the form of a worm which has a helical thread covered by a layer of tenaciously adhered tungsten carbide grits.

To adhere the grits to the worm thread, the thread is provided with a layer of bonding metal which will form a bond with tungsten carbide and which has a melting point higher than that of copper. A layer of grits and a brazing compound is applied over the bonding metal, the brazing compound being used to temporarily adhere the grits to the bonding metal. The brazing compound contains a very small amount of copper, much less than that ordinarily required in brazing procedures.

The bonding metal, grits, and brazing compound are then heated to a temperature above the melting point of copper to the melting point of the bonding metal to form a fused metal connection between the grits and bonding metal. The assembly is then cooled to solidify the materials forming this connection. The copper performs an important function in the formation of a strong bond in the fused metal connection, as is brought out in detail below. In the drawings.

Figure 1:
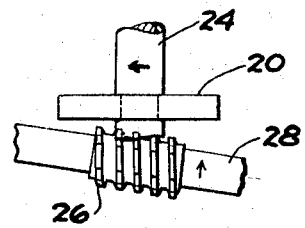
FIG. 1 is a fragmentary, partly diagrammatic view illustrating an initial step in the manufacture of a gear.
Figure 2:
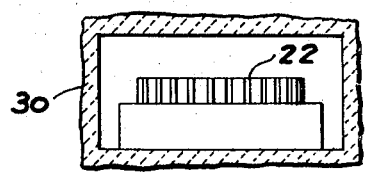
FIG. 2 is a diagrammatic view illustrating a subsequent heat-treating step.

Shown in FIG. 1 is a gear blank 20 of unhardened metal from which a gear 22 is to be made. Blank 20 is keyed to a shaft 24 on a conventional hobbing machine, and a hobbing cutting 26 is keyed to a shaft 28 thereon. Blank 20 and cutter 26 are shown out of cutting relation in FIG. 1 for convenience of illustration. Shafts 24 and 28 are driven at coordinated speeds so that upon advancement of blank 20 relative to the hobbing cutter, the cutter rough cuts teeth of the desired configuration in the blank to rough form gear 22. According to the invention, the rough formed gear is then hardened by subjecting it to heat treatment as in a heat-treating oven 30.

During the heat-treating step, gear 22 almost invariably sustains some distortion. The gear body may distort slightly out of its intended plane, and the gear teeth themselves may distort out of their intended shape.

Figure 3:
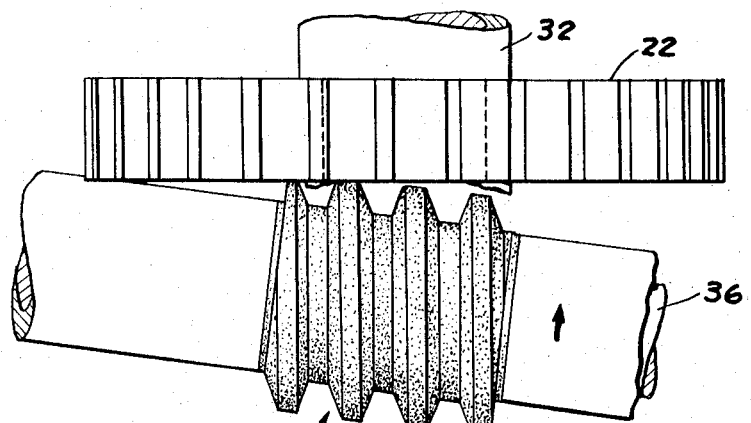
FIG. 3 is a fragmentary view illustrating a finish machining step in accordance with the present invention.
Figure 4:
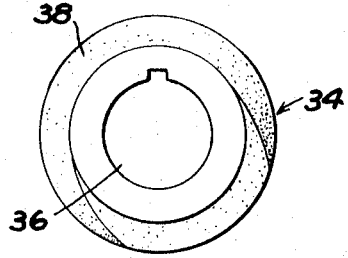
FIG. 4 is an end view of the tool illustrated in FIG. 3.
Figure 5:
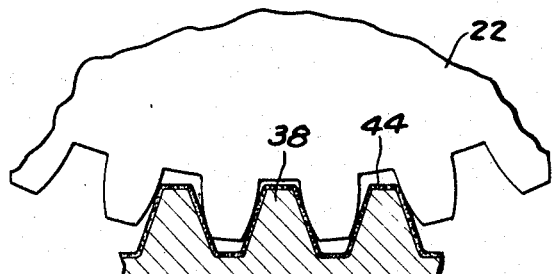
FIG. 5 is an enlarged, partly diagrammatic view illustrating a tool in accordance with this invention used for finish machining of a gear.

According to the invention, after gear 22 has been hardened by heat treating, it is mounted on a shaft 32. A tool 34 according to the invention is keyed onto a driven shaft 36 and is utilized to finish machine the gear or other article in hardened condition. Shafts 32 and 36 conveniently may comprise elements of a conventional hobbing machine. The gear and tool are shown out of engagement in FIG. 3 for convenience of illustration. This tool has the form of a worm provided with a helical thread 38 coated with tungsten carbide grits. According to the nature of the gear or other article, tool 34 is rotated by shaft 36 anywhere from about 100 r.p.m. to 2,000 r.p.m.; and upon advancement of the gear relative to the tool, thread 38 dentally engages the teeth on the gear (FIG. 5). Tool 34 is urged against gear 22 under forces which are normal in the machining arts.

As the tool rotates, the tungsten carbide grits thereon remove metal from the hardened gear teeth in sufficient quantity to reduce the gear from its rough-formed condition to finished condition; and during this machining, distortions at the surface of the gear teeth resulting from the heat-treating step are eliminated. In normal finishing operations, tool 34 removes about .001″ to .002″ thickness of metal or more from each side of the gear teeth. Axial advancement of the gear is continued until tooth 34 has finished machining the entire gear. The gear and tool are then disengaged, and the gear in finished condition is removed from shaft 32.

In contrast to hobbing cutters and shaving cutters which have large numbers of individual teeth for cutting a workpiece, thread 38 is, in general, smooth or continuous. The tool removes metal from the workpiece by an abrading action.

In the manufacture of the vast majority of articles for ordinary industrial or commercial use, gear 22 or other article is mounted on shaft 32 in such a way that it can rotate freely. The gear idles and follows the movement of tool thread 38 in the same manner that a worm wheel is driven by a worm engaged therewith. Where extreme precision is required, shaft 32 and gear 22 will be driven at a speed coordinated with the rate of rotation of tool 34.

Figure 6:
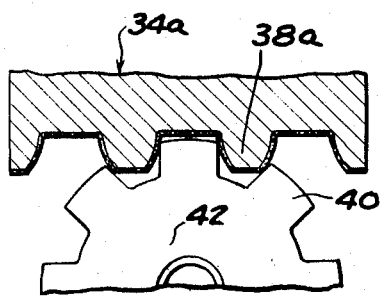
FIG. 6 is a view similar to FIG. 5 but showing the use of a tool according to this invention adapted for finish machining of a straight-sided spline.

Shown in FIG. 6 is a tool 34a generally similar to tool 34 except that it is provided with a thread 38a configured to finish machine straight-sided teeth 40 on a spline 42 which has previously been rough formed by hobbing and then hardened by heat treating. The spline is then finish machined in generally the same maner as gear 22 by gradually advancing it axially relative to the tool 34a. This axial movement is perpendicular to the plane of the paper.

A convenient way to provide tool 34 or 34a with its proper peripheral dimensions and configuration is to utilize the hobbing cutter which rough formed the article as a guide. Thread 38 or 38a is provided with the same configuration as the configuration on which lie the extremities of the teeth of the hobbing cutter except that the substrate portion of the thread has dimensions smaller than that of the cutter teeth by the thickness of the coating 44 of tungsten carbide grits thereon.

Tools 34, 34a according to this invention are, in general, made by the process which is the subject matter of my co-pending application Ser. No. 428,947, filed Jan. 29, 1965, and entitled "Method of Making a Tool for Removing Material From Workpieces and Product Thereof." For convenience of the reader, that process is repeated here with specific reference to the type of tools under consideration in this disclosure.

The tool comprises a substrate 46 made of a metal of rigidity and hardness suitable to the specific use of the tool, such metals being, for example, a steel such as SAE 8620 or 6150. This substrate is shaped to define thread 38. The layer 44 of tungsten carbide grits is adhered to the surface of thread 38 by means of a layer 48 of a bonding metal. This metal is one which will form a strong bond with substrate 46 and with tungsten carbide and which has a melting point higher than that of copper.

A suitable example of such a metal is "METCO" Thermo Spray Powder No. 15C which is a nickel-chromium-boron alloy whose analysis is shown at page 8 of a pamphlet entitled, "The Metco Flame Spraying Processes," published by Metallizing Engineering Company, Inc., Westbury, N.Y., in 1960. Other examples are METCO 15E and 15F which have similar analyses but differ primarily in fineness. The melting point of these alloys as used in the present process is about 2030° F. to 2050° F. However, it is believed that other bonding metals having melting points in the range of about 1850° F. to 2100° F. would be satisfactory, depending on such factors as the purity of the copper.

In manufacture, it is imperative that the surface 50 of substrate 46 to be coated with the grits be prepared in such a way that layer 48 of the bonding metal will not dislodge from the substrate under relatively great forces acting in a shear direction at the interfacing portions of layer 48 and substrate surface 50. Oxidized areas on surface 50 would form centers for the growth of further oxides which would ultimately loosen layer 48 so that it would strip off. Other foreign matter on the substrate would interfere with proper formation of a bond between layer 48 and surface 50 so that the layer would strip off.

Figure 7:
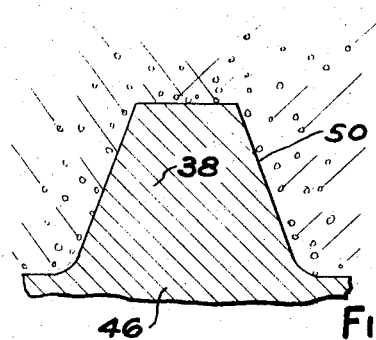
FIG. 7 is a diagrammatic representation of a shot-blasting step in the method of making a tool according to this invention.
Figure 8:
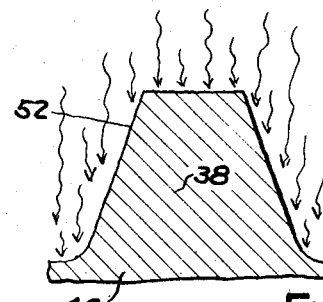
FIG. 8 is a diagrammatic representation of a subsequent heating step.
Figure 9:
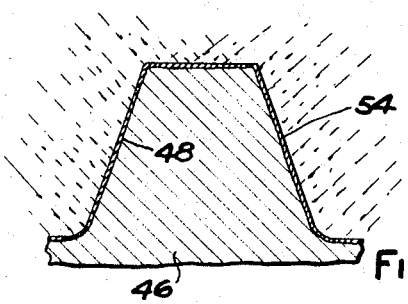
FIG. 9 is a diagrammatic representation of a subsequent metal-spraying step.

The process of preparing surface 50 includes, as a preferred step, a shot blasting of surface 50 as represented in FIG. 7. Then the shot-blasted surface 52 (FIG. 8) is heated to approximately 200° F. This heating must be done under such conditions as to prevent any substantial formation of oxides on the shot-blasted surface, and the surface must be protected from the deposition of other foreign matter. This can be done by placing substrate 46 in an oven immediately after the shot-blasting step and heating the entire substrate in a non-oxidizing atmosphere. Alternatively, surface 20 can be heated by a torch immediately after the shot-blasting step. If the shot-blasting step is performed under such conditions that foreign matter might become deposited on surface 52, this surface, prior to the heating step, should be cleansed with solvent such as carbon tetrachloride.

While surface 52 is in heated condition, the nickel-chromium-boron alloy, in fused condition, is applied over surface 52. This can be done by means of a conventional flame spray or metallizing gun of the general type disclosed in "The Metco Flame Spraying Processes" pamphlet referred to above. The alloy forms an extremely strong bond with surface 52 which is both a metallurgical bond and a mechanical bond with the roughening of surface 52 caused by the shot blasting. The substrate and alloy are allowed to cool, and then the exposed surface of the solidified alloy forms a bonding surface 54.

The depth to which the bonding metal is applied over the substrate depends upon the size of tungsten carbide grits which are to be adhered thereto. For example, where relatively small grits such as 200–325 mesh grits are to be used, the thickness of the bonding metal is from about .001″ to .003″. For grits of about 100 mesh, the bonding metal thickness is about .004″ to .005″. For 34–40 mesh grits, the thickness of the bonding metal is about .006″ to .008″. For relatively large grits such as ⅛″ grits, the thickness of the bonding layer will range from about .010″ to .015″.

After the substrate and its layers of bonding metal have been allowed to cool, the grits are temporarily adhered to bonding surface 54 by means of a brazing compound in fluent condition but having enough viscosity or tackiness to hold the grits in place on the bonding surface. One example of a suitable compound comprises Brazing Compound No. 3025, which is a product of Metachem Laboratories, Inc., of Hammond, Ind., to which is added about 20 percent by volume of a flux-containing material such as Brazing Vehicle No. 1, a product of the same company. This mixture is thinned with a suitable solvent such as Brazing Solvent No. 1, a product of the same company, to a viscosity which is just great enough to hold the grits on surface 54.

Figure 10:
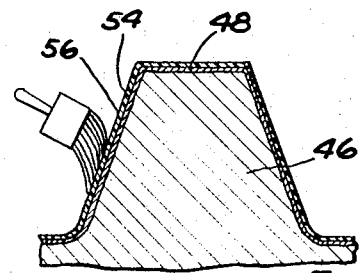
FIG. 10 is a diagrammatic representation of a subsequent step in which the brazing compound is applied.
Figure 11:
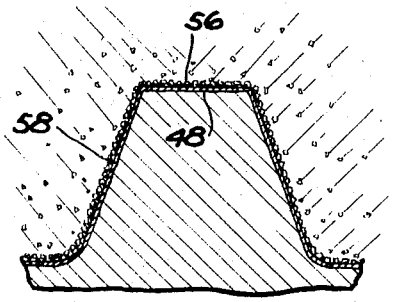
FIG. 11 is a diagrammatic representation of the application of the tungsten carbide grits over the brazing compound layer.

A convenient method of adhering the grits to surface 54 is first to paint or spray a layer 56 of the brazing compound over surface 54 (FIG. 10) and then spray the grits against layer 56 (FIG. 11). Those grits which contact an exposed portion of layer 56 will adhere thereto and those grits which do not contact an exposed portion of layer 56 will fall off. Thus, the grits are applied over layer 56 in a substantially single layer. It is preferable to cool substrate 46 and bonding layer 48 to room temperature before applying layer 56 to avoid causing the brazing compound to dry unduly before the grits are sprayed on.

By way of example, when relatively small grits are used (e.g., 200–325 mesh grits), the brazing compound is thinned to a watery consistency; and coating 56 will be about .001″ to .002″ thick. For 20–30 mesh grits, the brazing compound is thinned to a syrupy consistency; and coating 56 is about .005″ to .006″ thick. For relatively large grits such as 1/8" grits, the brazing compound is thinned to a muddy consistency; and coating 56 is about .010" to .015" thick.

Figure 13:
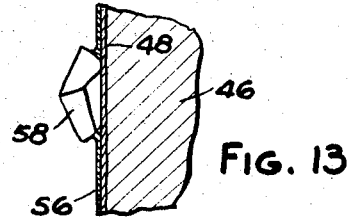
FIG. 13 is a greatly enlarged fragmentary diagrammatic elevational view illustrating the relation between the grits, substrate, and coatings following the spray step of FIG. 11.
Figure 12:
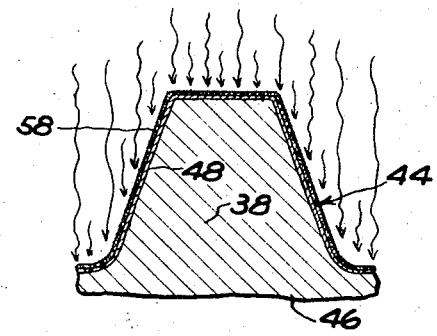
FIG. 12 is a diagrammatic representation of another heating step.

The relation of the grits 58, layers 56, 48, and substrate 46 after the grits have been sprayed on is illustrated in FIG. 13. The substrate with its layers of bonding metal, brazing compound, and grits is then subjected to heat (FIG. 12) so that the layer of bonding metal, brazing compound, and grits are elevated substantially to the melting point of the bonding metal. This is preferably done under such conditions as to prevent oxidation of the materials in these layers; and this can be conveniently performed in a conventional heat-treating furnace having a non-oxidizing atmosphere.

During the heating step, the copper in the brazing compound melts first at about 1950° F. to 2000° F. Then the bonding metal reaches its melting point. When this happens, it would normally be expected that all support for the grits would disappear: That the bonding metal would flow downwardly and wind up in a pool at the bottom of the substrate along with the grits. However, this does not happen.

Figure 14:
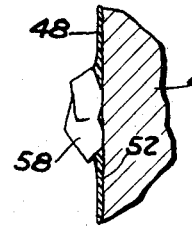
FIG. 14 is a view similar to FIG. 13 but showing the relation of the grits, substrate, and layer material following the heating step of FIG. 12.

To the contrary, the bonding metal appears suddenly to seize the grits; or conversely, the grits appear suddenly to sink into the bonding metal against the substrate. In any event, the grits and bonding metal remain in place with a fused metal connection being formed therebetween. When the assembly is cooled and the materials forming this connection are solidified, the bond between the grits and bonding metal is extremely strong. The relation between the substrate, resulting layer 48, and grits 58 is similar to the showing in FIG. 14, the grits having migrated to a location adjacent surface 52 of the substrate.

The phenomenon described in the preceding paragraph is not completely understood. It is theorized that when the assembly reaches the melting point of copper, the copper in the brazing compound melts and wets the grits forming an extremely thin film of copper between the grits and bonding surface 54 and possibly an extremely thin layer over part or all of the exposed portions of the grits themselves. It is also theorized that when the bonding metal begins to melt, it wets the copper-coated areas of the grits and flows around some or all portions of each grit.

Upon microscopic examination of a tool such as tool 34 according to this invention, it appears that the individual grits are all partially or completely coated with an extremely thin layer of the bonding metal. It is believed that the extent to which the area of each grit is coated may depend upon the extent to which its area was coated by the copper and upon the precise temperature attained by the grits and immediately adjacent bonding metal during the heating step. In this regard, it is to be noted that this precise temperature will vary slightly depending upon the mass of substrate 46 and the precise heating conditions within the oven.

It is to be noted that during this process only a very small amount of copper is used, that amount being just enough to wet the grits and form a film between the grits and bonding surface 54. If too much copper is used, the bond between the grits and bonding metal is weakened and the grits will strip off of the substrate. If not enough copper is used, the bond between the grits and bonding metal is not sufficiently strong and the grits will strip off.

In general, large grits have larger surface areas than relatively small grits and more copper must be used for the larger size grits. The method above described for adjusting the viscosity of the brazing compound also adjusts the amount of copper and flux contained in coating 56 and thus provides an extremely convenient method of providing the right amount of copper and flux. However, other methods may be used for providing the correct amounts of copper and flux in association with a substance by which the grits are temporarily adhered to surface 54 without departing from the invention.

In the finished tool, even though grits 58 may carry coatings of the copper and bonding metal, these coatings are extremely thin and do not interfere with the cutting action of the sharp edges of the grits. Thus, the tool is capable of removing metal to depths of several thousandths of an inch from a hardened steel workpiece such as gear 22 or spline 42.

In actual use, tools made according to the present invention have been used in finish machining of hardened steel gears and splines reliably through thousands of cycles of operation. A single machine tool according to this invention can be used to machine accurately 5,000 to 10,000 hardened automotive transmission splines depending upon the relative size of the tools and splines. Thus, tools made according to this invention accomplish what no tool has been capable of doing satisfactorily prior to the present invention. Once the coating on a tool has become worn, it can be stripped off by subjecting it to a deplating process in a conventional chrome-plating tank and substrate 46 can then be provided with a new tungsten carbide layer 44 in the manner described above.

Under normal tool pressures and operating speeds, tools 34, 34a have not become loaded in the course of work upon hardened steel workpieces and the like. The reason for this is not thoroughly understood, but it is theorized that the myriad tiny cutters formed by the edges of grits 58 remove the metal in chips so minute that insufficient heat is generated at any local area to cause any significant fusion of the chips; that the chips are continually moved about by relative movement of the tool and workpiece and that the chips themselves provide abrasive action which keeps the spaces between the cutters scrubbed out. Whether this is the correct explanation or not, however, the fact is that the tool does not normally become loaded during use.

Tools made according to this invention wear uniformly and at predictable rates and do not crumble or disintegrate during the course of use. Moreover, they are far more durable and less expensive than conventional grinding tools and shaving tools.

The bonding force between the grits and substrate is so strong that the grits are not pulled away from the substrate by the relatively high forces in a shear direction incidental to finish abrading by the tool of a hardened steel workpiece or the like.

I claim:

1. The method of making articles such as gears and splines having peripheral teeth or grooving which comprises, rough forming said article from unhardened metal, then subjecting said article in rough-formed condition to heat treatment to harden the same, providing a worm formed of metal and having a helical thread coated with myriad grits of tungsten carbide, after said article has been so hardened, pressing said coated worm thread into dental engagement with said article and rotating said worm, regulating the pressure of said worm thread against said article and the speed of rotation of said worm so that said worm thread removes metal from said article, and thereby both finish forming said article and removing distortions therefrom incidental to said heat treatment.

2. The method defined in claim 1 wherein said article is rough formed by machining a workpiece with a hobbing cutter, said coated worm thread being provided with a peripheral configuration generally similar to that of said hobbing cutter.

3. The method defined in claim 2 wherein said metal forming said worm thread has peripheral dimensions smaller than those of said hobbing cutter by substantially the thickness of said coating.

4. The method defined in claim 1 wherein said rotation of said worm is utilized to rotate said article.

5. The method defined in claim 1 wherein said article is formed by machining a workpiece with a hobbing cutter, the metal forming said worm thread being provided with a peripheral configuration generally similar to that of said hobbing cutter but having peripheral dimensions smaller than those of said hobbing cutter by substantially the thickness of said coating, said article, after being so hardened but before being engaged by said worm thread, being mounted for generally free rotation so that when engaged by said worm, rotation of said worm is utilized to rotate said article.

References Cited

UNITED STATES PATENTS

| | | | |
|---|---|---|---|
| 1,305,050 | 5/1919 | Beall | 72—340 |
| 1,329,805 | 2/1920 | Schurr | 90—1.6 |
| 1,412,185 | 4/1922 | Leipert | 29—159.2 |
| 1,415,261 | 5/1922 | Nixon et al. | 148—19 |
| 1,847,848 | 3/1932 | Ragan | 29—159.2 |
| 2,077,100 | 4/1937 | Edgar | 51—287 |

THOMAS H. EAGER, *Primary Examiner.*